(12) United States Patent
Boeck et al.

(10) Patent No.: US 12,534,136 B2
(45) Date of Patent: Jan. 27, 2026

(54) METHOD FOR PRODUCING A BODY FOR A MOTOR VEHICLE, AND BODY FOR A MOTOR VEHICLE

(71) Applicant: Bayerische Motoren Werke Aktiengesellschaft, Munich (DE)

(72) Inventors: Alexander Boeck, Munich (DE); Michael Hainzinger, Volkenschwand (DE); Johannes Hasselbach, Kissing (DE); Nermin Kecalevic, Markt Schwaben (DE); Juergen Leschhorn, Geltendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 413 days.

(21) Appl. No.: 18/013,593

(22) PCT Filed: May 31, 2021

(86) PCT No.: PCT/EP2021/064476
§ 371 (c)(1),
(2) Date: Dec. 29, 2022

(87) PCT Pub. No.: WO2022/002504
PCT Pub. Date: Jan. 6, 2022

(65) Prior Publication Data
US 2023/0286588 A1 Sep. 14, 2023

(30) Foreign Application Priority Data
Jun. 30, 2020 (DE) ..................... 10 2020 117 209.5

(51) Int. Cl.
*B62D 21/15* (2006.01)
*B62D 25/20* (2006.01)

(52) U.S. Cl.
CPC ....... *B62D 21/152* (2013.01); *B62D 25/2036* (2013.01)

(58) Field of Classification Search
CPC ........................... B62D 21/152; B62D 21/155
(Continued)

(56) References Cited

U.S. PATENT DOCUMENTS

| | | | |
|---|---|---|---|
| 6,688,676 B1* | 2/2004 | Sato .................. | B62D 25/2045 296/187.05 |
| 8,220,864 B2* | 7/2012 | Mildner ................ | B62D 25/14 296/193.09 |

(Continued)

FOREIGN PATENT DOCUMENTS

| | | |
|---|---|---|
| DE | 102 39 988 A1 | 4/2004 |
| DE | 10 2010 018 729 A1 | 11/2011 |

(Continued)

OTHER PUBLICATIONS

International Search Report (PCT/ISA/210) issued in PCT Application No. PCT/EP2021/064476 dated Sep. 23, 2021 with English translation (five (5) pages).

*Primary Examiner* — Dennis H Pedder
(74) *Attorney, Agent, or Firm* — Crowell & Moring LLP

(57) ABSTRACT

A method for producing a body for a motor vehicle, includes providing body components at least of a front structure of a passenger compartment of the motor vehicle which are useable in the manufacturing of a front structure of a passenger compartment of a first variant of the body, to produce the front structure of the passenger compartment of a second variant of the body. The first variant of the body is smaller and more lightweight than the second variant of the body. A corner region of the front structure of the second variant, in which a front wall of the front structure adjoins a front-side end region, belonging to the front structure, of a side sill of the passenger compartment, is designed to (Continued)

absorb a larger force impact than a corresponding corner region of the front structure of the first variant.

13 Claims, 3 Drawing Sheets

(58) Field of Classification Search
USPC ................................................ 296/187.09, 1
See application file for complete search history.

(56) References Cited

U.S. PATENT DOCUMENTS

| | | | | |
|---|---|---|---|---|
| 8,469,442 | B1* | 6/2013 | Pencak | B62D 25/16 |
| | | | | 296/198 |
| 9,365,245 | B2* | 6/2016 | Donabedian | B62D 25/04 |
| 9,821,853 | B2* | 11/2017 | Torikawa | B62D 25/025 |
| 2002/0063445 | A1* | 5/2002 | Takeuchi | B62D 25/16 |
| | | | | 296/203.02 |
| 2006/0175871 | A1 | 8/2006 | Eipper et al. | |
| 2016/0052554 | A1* | 2/2016 | Ozawa | B62D 21/152 |
| | | | | 296/187.09 |
| 2017/0246945 | A1 | 8/2017 | Hlubina et al. | |
| 2019/0315410 | A1 | 10/2019 | Shinya et al. | |

FOREIGN PATENT DOCUMENTS

| | | |
|---|---|---|
| DE | 10 2013 014 365 A1 | 4/2014 |
| DE | 10 2015 016 954 A1 | 7/2016 |
| DE | 10 2018 008 021 A1 | 4/2019 |
| EP | 2 441 653 A1 | 4/2012 |
| EP | 2 441 653 B1 | 4/2016 |

* cited by examiner

METHOD FOR PRODUCING A BODY FOR A MOTOR VEHICLE, AND BODY FOR A MOTOR VEHICLE

BACKGROUND AND SUMMARY

The invention relates to a method for manufacturing a body for a motor vehicle, in which body components of at least a front structure of a passenger compartment of the motor vehicle which are usable in the production of a front structure of a passenger compartment of a first variant of the body are used to manufacture the front structure of the passenger compartment of a second variant of the body. The invention also relates to a body for a motor vehicle.

EP 2 441 653 B1 describes a base assembly for a plurality of design variants of a body of a passenger vehicle. Here, a front-end module of identical configuration in the respective design variant is used for different design variants of the body. The front-end module which is identical across all variants comprises a bulkhead, respective longitudinal members, respective side wall elements for corresponding door pillars and a main base region. In order to enable adaptation of the base assembly to different lengths of the respective body of the passenger vehicle, the front-end module and a rear-end module which is likewise configured to cover all variants are connected to one another by way of a respective base arrangement. The base arrangement is configured in dependence on the respective design variant of the body.

A disadvantage to be considered here is the fact that such a multi-part construction of the base assembly in the region of a passenger compartment of the passenger vehicle is unwieldy. This is because it is necessary to arrange different base arrangements between the respective modules of uniform configuration, in the form of the front-end module and the rear-end module, depending on the variant of the passenger vehicle.

Furthermore, in motor vehicle construction, provision may be made for certain regions of a passenger compartment to be as structurally identical as possible across a plurality of derivatives of the motor vehicle or across a plurality of body variants of the motor vehicle. This has the aim of being able to make use of synergy effects and being flexible with regard to production technology.

Such an approach can, however, have the effect that regions of the passenger compartment are designed, for example with regard to absorption of impact energy, in such a way that the corresponding requirements of a critical derivative or a critical variant are met. Since the weight of a derivative has to be taken into account in the event of a collision involving the motor vehicle, the critical derivative may, for example, be the variant with the greatest weight. This in turn has the effect that the rest of the derivatives or the rest of the variants are burdened more than necessary with regard to the absorption of impact energy. In other words, the rest of the variants are designed by design precautions for the absorption of loads or of impact energy that are completely unnecessary on account of the lower weight of these derivatives. This is impractical.

Provision may also be made for the lighter variants to have the shortest possible front end length and the smallest possible distance of a front end of the passenger compartment from the center of a front wheel, that is to say the smallest possible "dash-to-axle" distance. This in particular entails that the motor vehicle with the lighter variant of the body is compact and maneuverable. However, such a configuration cannot be realized if measures for absorption of impact energy that are completely unnecessary per se are provided in the critical dimension chain behind the front wheel in the case of the lighter variant.

It is an object of the invention to provide a method of the type mentioned in the introduction which permits a requirement-based design of the front structure with particularly little effort, and to specify a corresponding body for a motor vehicle.

This object is achieved according to the invention by a method for manufacturing a body for a motor vehicle and by a body for a motor vehicle having the features of the independent claims. The dependent patent claims and the description provide advantageous embodiments of the invention.

In a method according to the invention for manufacturing a body for a motor vehicle, body components of at least a front structure of a passenger compartment of the motor vehicle which are usable in the production of a front structure of a passenger compartment of a first variant of the body are used to manufacture the front structure of the passenger compartment of a second variant of the body. The first variant of the body is smaller and lighter than the second variant of the body. A corner region of the front structure of the second variant is configured to absorb a greater application of force than a corresponding corner region of the front structure of the first variant. In the corner region, a bulkhead of the front structure adjoins a front-side end region, associated with the front structure, of a side sill of the passenger compartment.

Such a method permits a requirement-based design of the front structure with particularly little effort. This is because the body components of the front structure which are able to be used for the passenger compartment of the first variant of the body are used for the front structure of the passenger compartment of the second variant of the body. This means the design of the body for the respective variants requires very little effort. In order to nevertheless ensure that the corner region of the front structure of the second variant withstands increased loading, as may occur on account of the larger and heavier body compared with the first variant, the corner region of the front structure is configured to absorb the greater application of force.

This is based on the recognition that, in the case of the second, larger and heavier variant of the body, there is more space available in the corner region of the front structure than in the corresponding corner region of the front structure of the first variant. This space or installation space available in the second variant is, in the present case, utilized to design the corner region in a more robust manner with regard to the application of force and thus the supporting for instance of an impact force.

In the case of the motor vehicle with the heavier variant of the body, provision may for example be made for said motor vehicle to have at least one electric drive device and an electrical energy store, in particular in the form of a high-voltage battery, for feeding the electric drive device, wherein the high-voltage battery may be arranged in the region of a vehicle floor. The scaling measures which ensure that the corner region of the front structure is designed to absorb the greater application of force can in this case specifically take account of the increased protection needs of the high-voltage battery in this variant. This is because the high-voltage battery arranged, for example, below a floor of the passenger compartment is better protected from damage by the corner region which is configured to support a greater impact force.

Although the motor vehicle with the lighter variant of the body may also have an electric drive device and an electrical energy store for feeding the electric drive device, provision may in particular be made for the motor vehicle with the lighter variant of the body to have an internal combustion engine as drive device and the motor vehicle with the heavier variant of the body to have the electric drive device and the high-voltage battery.

However, in the case of the motor vehicle with the second variant of the body, it is not necessary for the entire front structure of the passenger compartment or even the entire passenger compartment to be designed in a more robust manner or so as to support a greater impact force. Rather, provision is made to at least for the most part use the same body components, which can be used in the front structure of the passenger compartment both in the first variant of the body and in the second variant of the body. Adaptation of the front structure with regard to the absorption of a greater force, in particular impact force, is carried out merely locally, namely in the front, outer corner region of the front structure.

Account is taken here of the fact that the corner region of the front structure, the bulkhead adjoining the front-side end region of the side sill in said corner region, is subjected to relatively pronounced loading in the event of the motor vehicle colliding with an obstacle. It is therefore expedient to provide this corner region with scalability in terms of the impact force that is intended to be supported or can be absorbed by the corner region.

Since a particularly large proportion of the body components forming at least the front structure of the passenger compartment and in particular the entire passenger compartment are, however, embodied to be structurally identical across the different variants of the body and can thus be used in an unchanged manner, it is particularly straightforward to design the different variants or derivatives of the respective body of the motor vehicle in a requirement-based manner with respect to the respective loading of the corner region.

In other words, on account of the use of common body components, that is to say body components of identical configuration across different variants of the body of the motor vehicle, in the region of the front structure of the passenger compartment of the motor vehicle, the respective measure for scaling the absorption of the respective impact force can be very readily controlled in a requirement-based manner.

Provision may in particular be made for the common body components in the different variants to have connections, for example in the form of flanges or the like, which are identical to or have the same form as those components which serve to scale the corner region for the respective loading.

In particular, it is possible for the installation space which in the second, larger and heavier variant of the body is additionally available in the corner region compared with the first variant to be used to provide the heavy derivative or the heavy variant with greater impact protection in the corner region than in the case of the first, lighter and smaller variant.

Preferably, for the provision of the corner region associated with the second variant, a subregion of the bulkhead, said subregion at least partially overlapping the front-side end region of the side sill in a direction of longitudinal extent of the side sill, is provided with at least one additional component on a side facing away from the side sill. The attachment of the at least one additional component in the subregion of the bulkhead makes it possible to ensure in a very simple manner that the corner region of the front structure of the second variant is configured to absorb the greater application of force.

In addition or as an alternative, provision may be made for the subregion of the bulkhead itself to provide the scalability possibility, that is to say modification of the subregion of the bulkhead ensures that the corner region of the front structure is designed for greater loading.

In particular, the at least one additional component may absorb impact energy by deformation and thus ensure that the corner region of the front structure is designed for the greater application of force.

Furthermore, the at least one additional component may very easily be accommodated at the location where the subregion of the bulkhead at least partially overlaps the front-side end region of the side sill in the direction of longitudinal extent thereof. This may in particular be due to the fact that the center of a front wheel of the motor vehicle is spaced apart further from the front-side end region of the side sill in the second variant of the body than in the first variant of the body. Consequently, given a motor vehicle passenger compartment that otherwise has the same form for the first variant and for the second variant and that is in particular the same size, the installation space which is additionally available in the second variant at the level of the side sill can be used in a very expedient manner to support a greater impact force by attaching the at least one additional component there.

In addition or as an alternative, for the provision of the corner region associated with the second variant, a subregion of the bulkhead, in which the bulkhead has at least one bulkhead transverse member, may be provided with at least one additional component on a side facing away from the bulkhead transverse member. In particular in the region of the at least one bulkhead transverse member, it is especially possible for loads occurring in the event of a collision involving the motor vehicle which has the front structure to be particularly readily absorbed. If the subregion of the bulkhead, in which the bulkhead has the at least one bulkhead transverse member or bulkhead supporting member, is then reinforced with the at least one additional component, this subregion is particularly well suited to dissipating impact energy.

Furthermore, this configuration of the second variant of the body is based on the recognition that the at least one additional component can be readily accommodated in the region of the at least one bulkhead transverse member because the second variant of the body is larger than the first variant of the body. Consequently, the passenger compartment both in the first variant and in the second variant of the body can remain unchanged with regard to the arrangement of the at least one bulkhead transverse member in the bulkhead, and only in the second variant is that subregion of the bulkhead which is associated with the corner region provided with the at least one additional component or is the at least one additional component attached to the subregion or portion of the bulkhead. As a result, this subregion of the bulkhead, said subregion forming part of the corner region of the front structure, is configured to absorb the greater application of force in the second variant of the body.

Preferably, the at least one additional component used is at least one stiffening component, the height of which is substantially equal to a height of the at least one bulkhead transverse member. It is thus particularly readily possible to locally stiffen the bulkhead in the region of the bulkhead transverse member. In this case, the weight of the front structure is advantageously only slightly increased in spite of the arrangement of the additional component on the subregion of the bulkhead.

Here, a position of the additional component, in particular a position of flanges of the additional component, is preferably additionally selected in such a way that such flanges are arranged congruently with corresponding flanges of the bulkhead transverse member or supporting member. It is thus possible to achieve very targeted and effective stiffening of the bulkhead in the region of the bulkhead transverse member.

Preferably, the at least one additional component has at least one connecting region in which the at least one additional component is connected to the subregion of the bulkhead, wherein the at least one additional component also has at least one load absorption region in which the at least one additional component is spaced apart from the subregion of the bulkhead. Such a profiled shaping of the additional component makes it possible, on the one hand, to achieve reliable attachment to the subregion of the bulkhead. On the other hand, such an additional component is particularly well suited to stiffening the bulkhead in the subregion and can at the same time be produced inexpensively and with little effort.

Preferably, a material and/or a wall thickness of the at least one additional component are/is determined in dependence on how much greater the application of force that can be absorbed by the corner region of the front structure of the second variant is compared with the corresponding corner region of the first variant. In this way, it is possible to ensure in a very simple manner that the front structure of the second variant in the corner region is designed to absorb the impact force which is to be respectively supported.

In addition or as an alternative, a shape and/or a size of the at least one additional component may be determined in dependence on how much greater the application of force that can be absorbed by the corner region of the front structure of the second variant is compared with the corresponding corner region of the first variant. Parameters such as the shape and/or the size of the additional component can especially also be adapted very easily, in order to achieve a requirement-based design of the front structure in the corner region with respect to the impact force which is to be respectively supported.

In addition or as an alternative, it may be provided that, for the provision of the corner region associated with the second variant, a material and/or a wall thickness of a subregion of the bulkhead, said subregion at least partially overlapping the front-side end region of the side sill in the direction of longitudinal extent of the side sill, are/is determined in dependence on how much greater the application of force that can be absorbed by the corner region is compared with the corresponding corner region of the first variant.

In addition or as an alternative, it is also possible for the shape of the subregion of the bulkhead, which at least partially overlaps the front-side end region of the side sill in the direction of longitudinal extent of the side sill, to be determined in dependence on how much greater the application of force that can be absorbed by the corner region is compared with the corresponding corner region of the first variant. In other words, it is also possible for the shape of at least the peripheral subregion of the bulkhead in the corner region to be adapted such that the corner region can absorb a greater impact force. Such adaptations of the bulkhead in the subregion are very easy to accomplish in terms of manufacturing. Furthermore, in this way, a central subregion or main part of the bulkhead can be kept common, that is to say be structurally identical, across the different variants. This is conducive to low-effort manufacturing of the body.

Furthermore, it is advantageous here that an already existing component of the front structure, namely the bulkhead, can be differentiated in the subregion, which is arranged in front of the front-side end region of the side sill in the direction of longitudinal extent of the side sill, with regard to the wall thickness and/or the material and/or the shape, in order to design the corner region in such a way that it is able to cope with the greater application of force or can support a greater impact force. This contributes to the particularly low-effort design of the method.

Preferably, for the provision of the second variant, the body components of the front structure which are usable for the production of the front structure of the first variant are connected to one another in the same connecting regions as for the provision of the first variant. In other words, the connecting regions are thus preferably of identical design both when the body components are used to produce the front structure of the first variant and when the body components are used to produce the front structure of the second variant. The connecting regions are for example in the form of connections and/or flanges, that is to say are preferably kept common or of identical configuration in the different variants.

In this way, it is not necessary for the body components to be connected to one another at different locations or differently configured locations depending on the respective variant of the body. Rather, it is possible for the components, which are identical in the different variants, to be connected to one another always at mutually corresponding locations and always in the same manner. This is also conducive to very low-effort provision of the respective variant of the front structure.

Preferably, for the provision of the first variant and for the provision of the second variant, use is made of a central subregion of the bulkhead that is structurally identical in the respective variant. In this way, there is particularly little difference in the bulkhead in the different variants of the front structure. This is also advantageous with regard to the reduction in effort when providing different variants of the body. These advantages are particularly afforded when, as is preferably provided, the central subregion of the bulkhead is a main part of the bulkhead.

Preferably, at least one front-side longitudinal member is connected to the bulkhead in the central subregion of the bulkhead. In particular, two front-side longitudinal members which are spaced apart from one another in a transverse direction of the front structure and thus parallel to the vehicle transverse axis may be connected to the bulkhead in the central subregion of the bulkhead. Such front-side longitudinal members are effective in particular in the event of a frontal collision involving the motor vehicle which has the front structure, in order to absorb or dissipate impact energy during the frontal collision or frontal crash.

Consequently, the provision of the at least one front-side longitudinal member, which may be arranged in the motor vehicle in the region of an engine compartment of the motor vehicle and which may therefore also be referred to as engine longitudinal member, is advantageous with regard to the design of the front structure for supporting impact forces.

Provision may be made for the at least one front-side longitudinal member to be differentiated with regard to the application of force for which the front-side longitudinal member is designed in the respective variant of the body. By way of example, the shape or geometry and/or the stiffness and/or the strength of the at least one front-side longitudinal member may be differentiated in dependence on the variant of the body. Such differentiations are advantageous for a requirement-based design of the front structure with regard to the supporting of impact forces. It is advantageous if an attachment region of the longitudinal member to the central subregion of the bulkhead also remains unchanged.

Preferably, for the provision of the corner region associated with the first variant and for the provision of the corner region associated with the second variant, use is made of an A-pillar part of the front structure that is structurally identical in the respective variant, said A-pillar part having a flange region which at least partially overlaps the front-side end region of the side sill. In this way, the A-pillar part is also readily incorporated into the corner region of the front structure. It is also possible for the structurally identical A-pillar part to be used for the different variants of the body. This is also advantageous with regard to low-effort manufacturing of the front structure or of the passenger compartment.

A body according to the invention for a motor vehicle comprises body components for providing at least a front structure of a passenger compartment of the motor vehicle. The body components are usable in the production of a front structure of a passenger compartment of a first variant of the body, and the body components are in the form of components of the front structure of the passenger compartment of a second variant of the body. Here, the first variant of the body is smaller and lighter than the second variant of the body. Furthermore, a corner region of the front structure of the second variant, a bulkhead of the front structure adjoining a front-side end region, associated with the front structure, of a side sill of the passenger compartment in said corner region, is configured to absorb a greater application of force than a corresponding corner region of the front structure of the first variant.

In the case of the body, for the provision of the front structure of the passenger compartment, use is thus made of body components which are also used in structurally identical configuration for the provision of at least the front structure of the passenger compartment of the first, smaller and lighter variant of the body. However, in the second variant of the body, the corner region of the front structure is configured to support a greater impact force compared with the first variant of the body. In particular, the front, outer corners of the front region of the passenger compartment are thus designed with regard to the supporting of a respective impact force, whereas preferably the rest of the components or at least a large proportion of the components of the passenger compartment are structurally identical in the different variants of the body. It thus becomes particularly simple to design the front structure in a requirement-based manner.

The advantages and preferred embodiments described for the method according to the invention also apply to the body according to the invention, and vice versa.

Further features of the invention will emerge from the claims, from the figures and from the description of the figures. The features and feature combinations mentioned above in the description, and the features and feature combinations mentioned below in the description of the figures and/or shown only in the figures, may be used not only in the respectively specified combination but also in other combinations or individually.

The invention will now be discussed in more detail on the basis of preferred exemplary embodiments and with reference to the drawings.

DETAILED DESCRIPTION OF THE DRAWINGS

Figure 1:
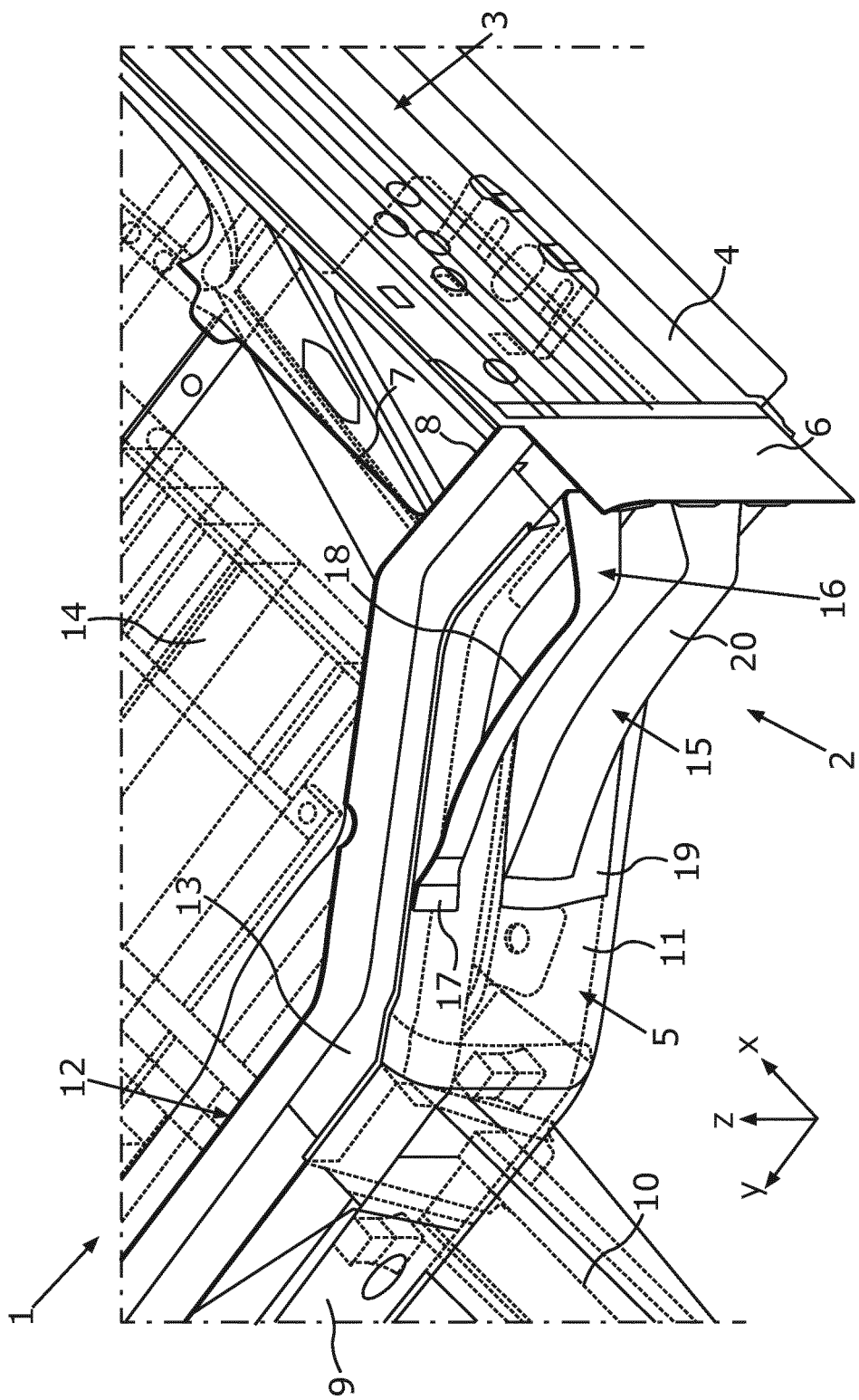
FIG. 1 is a schematic, partially sectional perspective view of a detail of a front structure of a passenger compartment for a motor vehicle, wherein additional components are attached to a subregion of a bulkhead of the front structure in a corner region of the front structure, in order to design the front structure to support a greater impact force in the corner region than in the case of a smaller and lighter variant of the motor vehicle.

FIG. 1 shows a schematic, partially sectional respective view of a front structure 1 or a front region of a passenger compartment of a motor vehicle. Here, the front structure 1 comprises a plurality of body components which are used in a structurally identical embodiment for the provision of the respective passenger compartment in different variants of the motor vehicle.

For the purpose of illustration, it will be assumed in the present case that the passenger compartment has a certain size in a first derivative or a first variant of the body of the motor vehicle, this first variant of the body being relatively small and lightweight. A passenger compartment which is identical in terms of the inner dimensions at least in the region of the front structure 1 is also used in a motor vehicle with a second variant of the body. This second variant of the body is, however, a larger and heavier variant. On account of the greater mass of the second variant of the body, the body components of the passenger compartment have to be designed to support a greater impact force than is the case in the smaller and lighter variant of the body.

In the present case, use is nevertheless made of at least partially or very largely identical body components for the provision of the passenger compartment and in particular the front structure 1 of the passenger compartment, and only in a respective front, outer corner region 2 of the front structure 1 are adaptations made so that this corner region 2 can support a greater impact force or is configured to absorb a greater application of force in the second variant.

In a deviation from the case of a passenger compartment which is identical in terms of the inner dimensions as outlined for the purpose of simplified illustration, provision may be made for the inner dimensions of the passenger compartment to be configured so as to be differentiated from one another in the first, small variant and in the second, large variant. This applies, for example, to the available space in the passenger compartment in the region of a rear row of seats. However, in such a case, it is also advantageous if at least a subregion of the passenger compartment, said subregion adjoining a bulkhead, which delimits the front side of the passenger compartment, toward the rear of the motor vehicle, is of identical configuration with regard to the inner dimensions in the different variants.

A first, exemplary possibility of configuring the corner region 2 of the front structure 1 to absorb the greater application of force in the second variant of the body will be discussed with reference to FIG. 1.

According to FIG. 1, the passenger compartment is delimited in the direction of the vehicle transverse axis y of the motor vehicle by a side sill 3. A front-side end region 4 of the side sill 3 overlaps an outer region of a bulkhead 5 of the front structure 1. In the present case, the bulkhead 5 comprises a flange 6 which is provided for the attachment of a side frame (not shown) of the body. In the present case, this flange 6 extends to some extent in the direction of the vehicle longitudinal axis x, and thus in the direction of longitudinal extent of the side sill 3, and also in the direction of the vehicle vertical axis z. The vehicle longitudinal axis x, the vehicle transverse axis y and the vehicle vertical axis z are illustrated by means of a coordinate system in FIG. 1.

In the present case, the front structure 1 of the passenger compartment also has an A-pillar part 7 which extends substantially along or in the direction of the vehicle vertical axis z. According to FIG. 1, a flange region 8 of the A-pillar part 7 overlaps the front-side end region 4 of the side sill 3.

In the present case, the bulkhead 5, which delimits the passenger compartment toward the front of the motor vehicle and thus in the direction of the vehicle longitudinal axis x, has a central subregion 9 in which a front-side longitudinal member 10 is connected to the bulkhead 5. This central subregion 9 is adjoined toward the vehicle outer side and thus toward the side sill 3 by a further subregion 11 of the bulkhead 5, said further subregion overlapping the side sill 3 or overlapping the front-side end region 4 of the side sill 3 in the direction of the vehicle longitudinal axis x.

Furthermore, FIG. 1 of the front structure 1 shows a bulkhead transverse member 12 which, in the present case, that is to say in the variant of the front structure 1 which is shown by way of example, is reinforced by a bulkhead plate 13. The (optional) bulkhead plate 13 extends, in the direction of the vehicle transverse axis y, from the front-side longitudinal member 10 toward the side sill 3. The passenger compartment is delimited on the underside by at least one floor plate 14, the front-side subregion of which is associated with the front structure 1.

The aforementioned body components of the front structure 1 can be used as illustrated in FIG. 1 in the first, relatively small and lightweight variant of the body of the motor vehicle. However, FIG. 1 shows the front structure 1 of the second, larger and heavier variant of the body, in which the front structure 1 is reinforced in the corner region 2 such that a greater impact force can be supported in the corner region 2.

To this end, in the variant of the front structure 1 which is shown by way of example in FIG. 1, at least one additional component 15, 16, which is connected to the outer subregion 11 of the bulkhead 5, is provided in the corner region 2. In the present case, there are by way of example two additional components 15, 16 in the form of profiled plates in the corner region 2, the upper additional component 16 in the direction of the vehicle vertical axis z being illustrated in partial section. In variants (not shown), it is also possible for only one additional component to reinforce the corner region 2 of the front structure 1, in order to design said corner region in a requirement-based manner for supporting the greater impact force.

In the present case, the upper additional component 16 in FIG. 1 has a connecting region 17 in which the additional component 16 is connected to the subregion 11 of the bulkhead 5. Furthermore, the additional component 16 comprises a load absorption region 18 in which the additional component 16 is spaced apart from the subregion 11 of the bulkhead 5. On account of such a profiling of the additional component 16, the additional component 16 is able to absorb impact energy by deformation when the motor vehicle collides with an obstacle, in the event of which a corresponding force is applied to the corner region 2.

In the second, larger variant of the body of the motor vehicle, there is sufficient space to accommodate the at least one additional component 15, 16 in the corner region 2. This may be due, in the second variant of the body of the motor vehicle, to the fact that the center of a front wheel (not shown) of the motor vehicle is spaced apart in the direction of the vehicle longitudinal axis x further from the front-side end region 4 of the side sill 3 than in the first variant of the body, in which the front structure 1 does not have the additional components 15, 16. In this variant (not shown) of the front structure 1 or of the body of the motor vehicle which is smaller and lighter than the body of the larger and heavier motor vehicle, a detail of which is shown in the present case, the center of the front wheel (not shown) is, by contrast, for example closer to the front end region 4 of the side sill 3.

As described for the second additional component 16, in the variant of the front structure 1 which is shown by way of example in FIG. 1, the first additional component 15 also has a connecting region 19 in which the first additional component 15 is connected to the peripheral subregion 11 of the bulkhead 5. Furthermore, in the present case, the first additional component 15 also has a load absorption region 20 in which the additional component 15 is spaced apart from the subregion 11 of the bulkhead 5 or in which the additional component 15 is configured to be curved away from the subregion 11 of the bulkhead 5. The respective connecting region 17, 19 may in particular be configured to run around the respective load absorption region 18, 20.

In the present case, the respective additional component 15, 16 extends in the transverse direction of the front structure, that is to say in the direction of the vehicle transverse axis y, such that the respective additional component 15, 16 may also be referred to as transverse profile.

In dependence on the corresponding variant of the body of the motor vehicle, the corner region 2 may be differentiated to the effect as to whether or not the at least one additional component 15, 16 is installed at all. In addition or as an alternative, a material and/or a wall thickness and/or a shape and/or a size of the at least one additional component 15, 16 may be designed in such a way as is required for supporting the respective impact force in the respective variant of the body of the motor vehicle.

Figure 2:
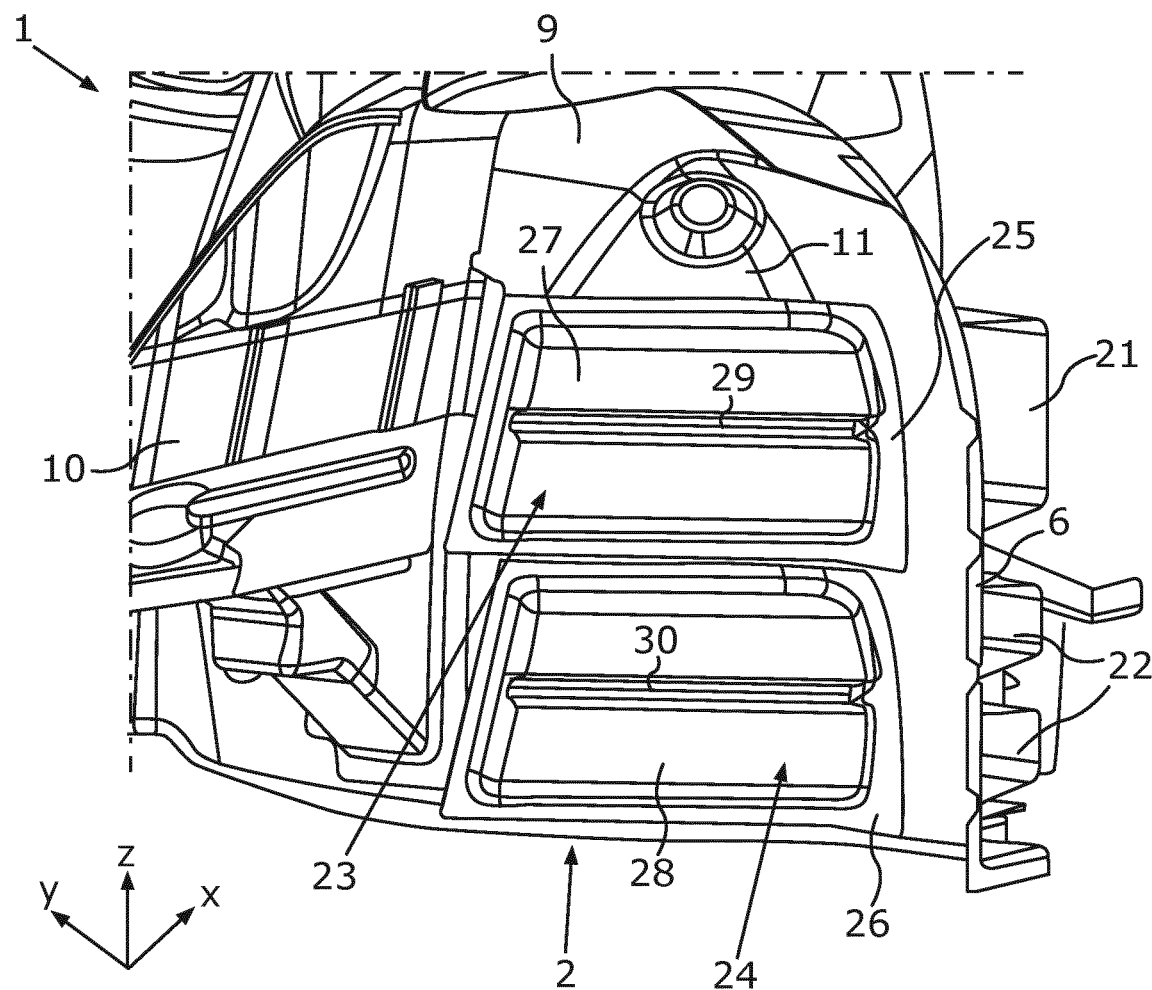
FIG. 2 is a schematic, partially sectional perspective view of a variant of the corner region, in which two additional components are attached to the bulkhead in the region of respective bulkhead transverse members.

FIG. 2 shows a further variant of the front structure 1, in which the corner region 2 is configured to absorb a greater application of force than in the case of the small and lightweight variant of the body, as has been discussed with reference to FIG. 1. In the variant of the front structure 1 which is shown in FIG. 2, a detail of the front-side longitudinal member 10, which is connected to the bulkhead 5 in the central subregion 9, is shown. Furthermore, the outer subregion 11 of the bulkhead 5 in the direction of the vehicle transverse axis y and also the flange 6 for the attachment of the side frame (not shown) of the motor vehicle are shown.

However, in the variant of the front structure 1 which is shown in FIG. 2, the bulkhead 5 has an upper supporting member or upper bulkhead transverse member 21 and a lower supporting member or lower bulkhead transverse member 22. The upper bulkhead transverse member 21 is in this case arranged approximately at the level of the front-side longitudinal member 10 in the direction of the vehicle vertical axis z.

In the variant of the front structure 1 which is shown in FIG. 2, a first additional component 23 and a second additional component 24 are arranged on the outer subregion 11 of the bulkhead 5. The first additional component 23 is in this case located approximately at the level of the upper bulkhead transverse member 21, and the second additional component 24 is located approximately at the level of the lower bulkhead transverse member 22. In the configuration of the front structure 1 which is shown by way of example in FIG. 2, the additional components 23, 24 are in the form of profiled plates which each have an encircling flange region 25, 26.

By way of example, the upper additional component 23 in FIG. 2 is connected, in the encircling flange region 25, both to the outer subregion 11 of the bulkhead 5 and to the central subregion 9 of the bulkhead 5. This applies analogously to the encircling flange region 26 of the second additional component 24, which is arranged at the level of the lower bulkhead transverse member 22.

In the present case, the additional components 23, 24 shown in FIG. 2 also have respective load absorption regions 27, 28 which are configured in the manner of bulges and which are curved away from the subregions 9, 11 of the bulkhead 5. In the present case, the load absorption region 27 of the first additional component 23 is provided with a bead 29 for stiffening purposes, said bead running, in the present case, substantially in the direction of the vehicle transverse axis y. The second additional component 24 also has such a bead 30 in the load absorption region 28. This produces a profiling of the respective additional component 23, 24 as can be provided in the case of a crash barrier used in road traffic.

However, the shaping and size of the additional components 23, 24 shown in FIG. 2 is merely exemplary, and other configurations of the front structure 1 may also involve the use of additional components 23, 24 of different shape and/or of different size and/or which have different wall thicknesses and/or which are formed from at least one different material, in order to scale or design the corner region 2 with regard to the supporting of an impact force associated with the respective variant of the body. This applies analogously to the additional components 15, 16 shown by way of example in FIG. 1.

In the case of the front structure 1 shown in FIG. 2, the corner region 2 may also be differentiated to the effect that, depending on the variant of the body, a decision is made as to whether or not at least one such additional component 23, 24 is installed at all. It is furthermore also possible here for the material and/or the wall thickness and/or the shape and/or the size of these additional components 23, 24, which in the present case are configured in the manner of stiffening plates or bulkhead plates, to be varied depending on the requirements on the respective body of the motor vehicle.

Figure 3:
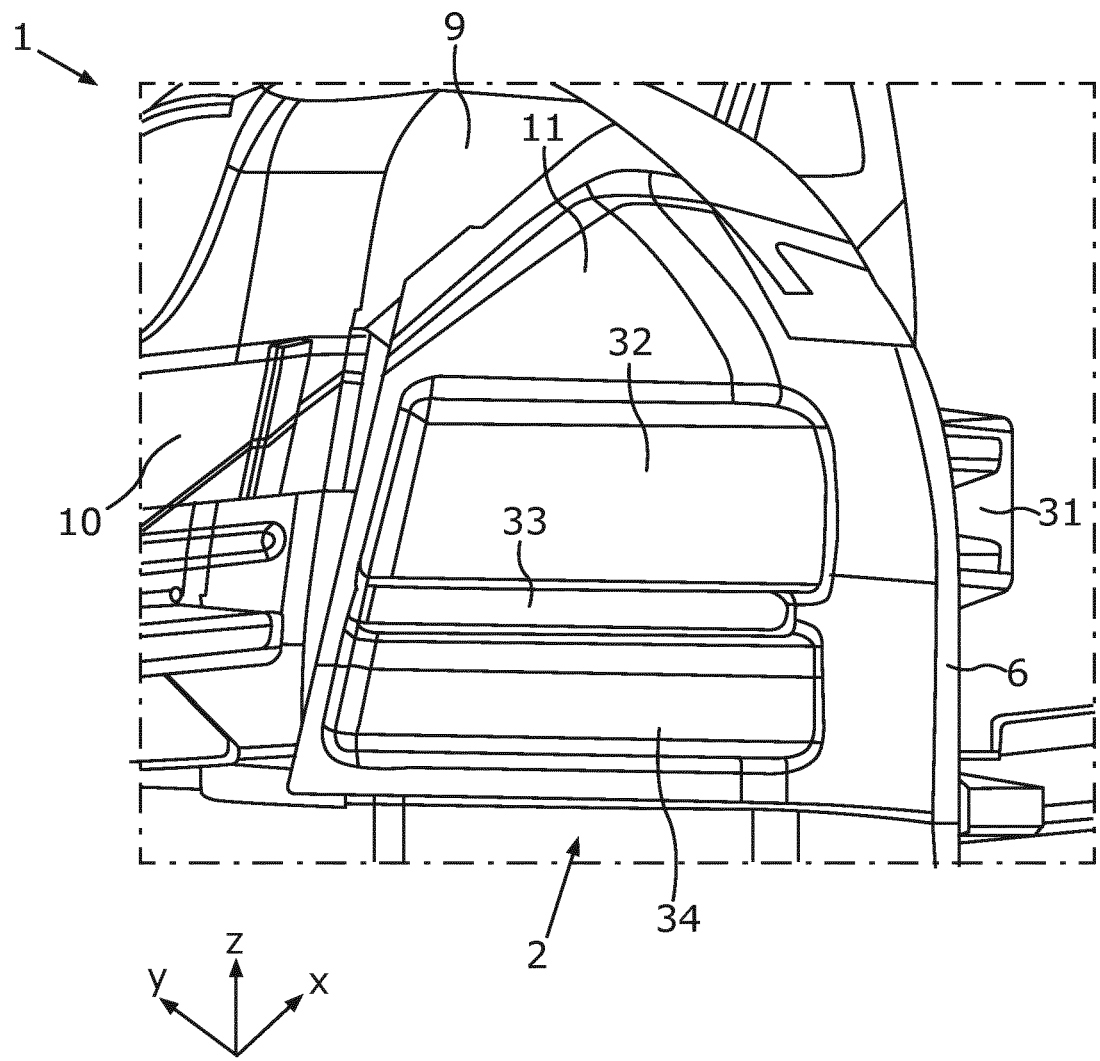
FIG. 3 is a further variant of the corner region of the front structure, in which, for the scaling of the corner region to support a greater impact force, a peripheral, outer subregion of the bulkhead is formed by a profiled component.

FIG. 3 shows a detail of a further variant of the front structure 1, in which in turn only a small piece of the front-side longitudinal member 10, which is connected to the central subregion 9 of the bulkhead 5, can be seen. In the variant shown in FIG. 3, in contrast to the variant shown in FIG. 2, the bulkhead 5 in turn has only one supporting member or bulkhead transverse member 31. And the outer subregion 11 of the bulkhead 5 also has the flange 6 for the attachment of the side frame (not shown) in the configuration of the front structure 1 which is shown in FIG. 3. However, according to FIG. 3, in the case of this front structure 1, the outer subregion 11 of the bulkhead 5 is designed in such a way that the corner region 2 of the front structure 1 is designed to support a greater impact force.

Correspondingly, in the variant shown in FIG. 3, unlike as is shown in FIG. 2, the outer subregion 11 of the bulkhead 5 itself is in the form of a profiled component. Here, the subregion 11 has, for example, a bulge 32 which is configured in the manner of a wide bead and which is spaced apart further from the front-side end region 4 of the side sill 3 (not shown in FIG. 3) than portions of the subregion 11 which are not curved or profiled. It is thus the subregion 11 of the bulkhead 5 itself that is in the form of a reinforced component, said subregion being connected to the central subregion 9 of the bulkhead 5.

In the configuration of the front structure 1 which is shown by way of example in FIG. 3, the bulge 32 is located at the level of the bulkhead transverse member 31. This upper bulge 32 in FIG. 3 is spaced apart from a further bulge 34 of the subregion 11 by means of a bead 33, said further bulge being arranged, in the present case, below the bulkhead transverse member 31 and being formed, just like the bulge 32, in one piece with the subregion 11.

In the configuration of the front structure 1 which is shown in FIG. 3, the differentiation is thus effected by way of the separate component in the form of the outer subregion 11 of the bulkhead 5. Here, advantage is also taken of the fact that such a bulkhead plate, which forms the subregion 11, can be readily accommodated in the corner region 2 on account of the greater amount of installation space available in the larger and heavier variant of the body of the motor vehicle.

In addition or as an alternative, provision may be made for components, in particular plate components, which are configured to provide the bulkhead 5 to be differentiated with regard to the material and/or the wall thickness in the corner region 2 in such a way that they can support the respective impact force in the respective variant of the body of the motor vehicle.

The above-described variants of the front structure 1 entail that a scalability of the passenger compartment, in particular in the corner region 2, is provided in the case of a common passenger compartment, that is to say a passenger compartment which uses identical components. This is because the respective corner region 2 can be designed in a requirement-based manner with respect to the respective loading which is to be provided for for the respective body variant of the motor vehicle.

In these variants, it is preferably ensured that the connecting regions, for example in the form of connections or flanges, of the body components of the front structure 1 or of the passenger compartment which are structurally identical in the different variants of the body remain unchanged.

LIST OF REFERENCE DESIGNATIONS

1 Front structure
2 Corner region
3 Side sill
4 End region
5 Bulkhead
6 Flange
7 A-pillar part
8 Flange region
9 Subregion
10 Longitudinal member
11 Subregion
12 Bulkhead transverse member
13 Bulkhead plate
14 Floor plate
15 Additional component
16 Additional component
17 Connecting region 18 Load absorption region
19 Connecting region
20 Load absorption region
21 Bulkhead transverse member
22 Bulkhead transverse member
23 Additional component
24 Additional component
25 Flange region
26 Flange region
27 Load absorption region
28 Load absorption region
29 Bead
30 Bead
31 Bulkhead transverse member
32 Bulge
33 Bead
34 Bulge
x Vehicle longitudinal axis
y Vehicle transverse axis
z Vehicle vertical axis

The invention claimed is:

1. A method for manufacturing a body for a motor vehicle, comprising:
providing body components of at least a front structure of a passenger compartment of the motor vehicle, which are usable in producing a front structure of a passenger compartment of a first variant of the body, to manufacture the front structure of the passenger compartment of a second variant of the body,
wherein
the first variant of the body is smaller and lighter than the second variant of the body, and
a corner region of the front structure of the second variant in which a bulkhead of the front structure adjoins a front-side end region, associated with the front structure, of a side sill of the passenger compartment, is configured to absorb a greater application of force than a corresponding corner region of the front structure of the first variant.

2. The method according to claim 1, wherein
for producing the corner region associated with the second variant, a subregion of the bulkhead, said subregion at least partially overlapping the front-side end region of the side sill in a direction of longitudinal extent of the side sill, is provided with at least one additional component on a side facing away from the side sill.

3. The method according to claim 1, wherein
for producing the corner region associated with the second variant, a subregion of the bulkhead, in which the bulkhead has at least one bulkhead transverse member, is provided with at least one additional component on a side facing away from the bulkhead transverse member.

4. The method according to claim 3, wherein
the at least one additional component used is a stiffening component, a height of which is substantially equal to a height of the at least one bulkhead transverse member.

5. The method according to claim 2, wherein
the at least one additional component has at least one connecting region in which the at least one additional component is connected to the subregion of the bulkhead, and has at least one load absorption region in which the at least one additional component is spaced apart from the subregion of the bulkhead.

6. The method according to claim 2, wherein
a material and/or a wall thickness of the at least one additional component are/is determined in dependence on how much greater an application of force that can be absorbed by the corner region of the front structure of the second variant is compared with the corresponding corner region of the first variant.

7. The method according to claim 6, wherein
a shape and/or a size of the at least one additional component are/is determined in dependence on how much greater an application of force that can be absorbed by the corner region of the front structure of the second variant is compared with the corresponding corner region of the first variant.

8. The method according to claim 2, wherein
a shape and/or a size of the at least one additional component are/is determined in dependence on how much greater an application of force that can be absorbed by the corner region of the front structure of the second variant is compared with the corresponding corner region of the first variant.

9. The method according to claim 1, wherein
for producing the corner region associated with the second variant, a material and/or a wall thickness and/or a shape of a subregion of the bulkhead, said subregion at least partially overlapping the front-side end region of the side sill in the direction of longitudinal extent of the side sill, are/is determined in dependence on how much greater an application of force that can be absorbed by the corner region is compared with the corresponding corner region of the first variant.

10. The method according to claim 1, wherein
for producing the second variant, the body components of the front structure which are usable for producing the front structure of the first variant are connected to one another in same connecting regions as for producing the first variant.

11. The method according to claim 1, wherein
for producing the first variant and for producing the second variant, use is made of a central subregion of the bulkhead that is structurally identical in each respective variant, at least one front-side longitudinal member being connected to the bulkhead in said central subregion.

12. The method according to claim 1, wherein
for producing the corner region associated with the first variant and for producing the corner region associated with the second variant, use is made of an A-pillar part of the front structure that is structurally identical in each respective variant, said A-pillar part having a flange region which at least partially overlaps the front-side end region of the side sill.

13. A body for a motor vehicle, comprising:
body components for providing at least a front structure of a passenger compartment of the motor vehicle, wherein
the body components are usable in producing the front structure of a passenger compartment of a first variant of the body, and wherein the body components are in the form of components of the front structure of the passenger compartment of a second variant of the body,
the first variant of the body is smaller and lighter than the second variant of the body, and
a corner region of the front structure of the second variant, in which a bulkhead of the front structure adjoins a front-side end region, associated with the front structure, of a side sill of the passenger compartment, is configured to absorb a greater application of force than a corresponding corner region of the front structure of the first variant.

* * * * *